United States Patent [19]

Umeki

[11] 4,305,921
[45] Dec. 15, 1981

[54] PROCESS FOR PRODUCING IRON OXIDE

[75] Inventor: Shinji Umeki, Tokyo, Japan

[73] Assignee: TDK Electronics Co., Ltd., Tokyo, Japan

[21] Appl. No.: 143,513

[22] Filed: Apr. 24, 1980

[30] Foreign Application Priority Data

May 11, 1979 [JP] Japan ................................ 54/58356

[51] Int. Cl.$^3$ ............................................. C01G 49/08
[52] U.S. Cl. ................................. 423/632; 252/62.56; 252/62.59; 252/62.62
[58] Field of Search ..................... 252/62.56; 423/632, 423/634, 62.59, 62.62

[56]       References Cited
U.S. PATENT DOCUMENTS 4,096,292  6/1978  Fagherazzi et al. ......... 252/62.56 X

FOREIGN PATENT DOCUMENTS 675260  7/1952  United Kingdom ................ 423/634

Primary Examiner—Jack Cooper
Attorney, Agent, or Firm—Oblon, Fisher, Spivak, McClelland & Maier

[57]           ABSTRACT

In a process for producing an iron oxide having magnetite as a main component by heating to reduce a powder of an oxide or a hydrated iron oxide comprising an iron oxide as a main component in an atmosphere for reduction, an improvement characterized in that said atmosphere for reduction is formed by passing an industrial liquefied nitrogen gas.

2 Claims, No Drawings

PROCESS FOR PRODUCING IRON OXIDE

BACKGROUND OF THE INVENTION

1. Field of the Invention

The present invention relates to a process for producing an iron oxide used for a magnetic recording medium. More particularly, it relates to a process for producing a magnetite powder which imparts superior magnetic characteristics by reducing an iron oxide powder without sintering under high chemical stability even at high temperature.

2. Description of the Prior Arts

Magnetite powder has been used for a magnetic recording medium. Usually, the magnetite powder has been produced by reducing acicular goethite powder with hydrogen gas.

When the magnetite powder is used for the magnetic recording medium, excellent magnetic characteristics are required especially higher coercive force and intensity of magnetization are required.

Heretofore, in order to produce magnetite ($Fe_3O_4$) by heating an iron oxide ($Fe_2O_3$) in an inert gas, a high temperature such as higher than 1000° C. has been required. When an iron oxide powder is used as the starting material, a sintering has been caused and a magnetite having desired magnetic characteristics could not be obtained.

SUMMARY OF THE INVENTION

It is an object of the present invention to provide a process for producing an iron oxide comprising magnetite as a main component which has excellent magnetic characteristics.

It is another object of the present invention to provide a process for producing an iron oxide comprising magnetite as a main component which has excellent magnetic characteristics without any sintering by heating at relatively lower temperature.

The foregoing and other objects of the present invention have been attained by producing an iron oxide having magnetite as a main component which is used for a magnetic recording medium by heating to reduce a powder of an oxide or a hydrated oxide comprising an iron oxide as a main component in an atmosphere passing an industrial liquefied nitrogen gas separated from air.

DETAILED DESCRIPTION OF THE PREFERRED EMBODIMENTS

The inventors have studied and have found that the magnetite powder can be obtained by heating it only at about 600° C. in an atmosphere passing an industrial liquefied nitrogen gas and moreover, the magnetite had superior coercive force (Hc) and intensity of magnetization (sigma S) in comparison with those of the product obtained by reducing with hydrogen gas.

The starting materials in the process of the present invention include hydrated iron oxides such as goethite and lepidocrosite; α-iron oxides obtained by dehydrating the hydrated iron oxide; and hydrated iron oxides and γ-iron oxides which incorporate a small amount of a Si or Al component as a sintering proofing agent, or a small amount of a Zn or Ni component for controlling a size or shape of the particle; or a small amount of a Co or Mn component for improving the coercive force of the product.

The particles of the magnetite obtained by a reduction of the hydrated iron oxide is usually has a length of 0.1 to 2μ preferably 0.2 to 1μ and an acicular ratio of 2 to 40 preferably 5 to 20.

The aqueous solution of ferrous ion can be produced by dissolving a ferrous compound such as ferrous chloride, ferrous sulfate, ferrous nitrate etc. in water. A concentration of the ferrous compound is from a saturated concentration to 0.5 wt.% preferably 5 to 40 wt.% especially 10 to 30 wt.%.

The base is preferably sodium hydroxide, carbonate or bicarbonate or potassium hydroxide, carbonate or bicarbonate or ammonium hydroxide.

The concentration of the base is usually 1 to 40 wt.% preferably 5 to 30 wt.%.

The oxidizing agent can be alkali chlorates, air, oxygen, ozone and alkali nitrates. The oxidizing agent is added at a ratio of more than a stoichiometric amount for converting a ferrous compound into a ferric compound. The oxidizing agent can be added before, during or after the mixing of the aqueous solution of ferrous ion with the base, since the oxidation is performed after forming ferrous hydroxide. That is, the oxidizing agent can be mixed with the base or a slurry of ferrous hydroxide. The temperature for the oxidation is usually in a range of 0° to 80° C. preferably 5° to 60° C. especially 20° to 50° C.

The conventional air bubbling oxidation method can be also employed.

The preparation of a hydrated iron oxide can be modified as desired.

In accordance with the process of the present invention, the reducing reaction is satisfactorily performed even at a relatively lower temperature of about 600° C. to obtain the magnetite powder having excellent magnetic characteristics.

It is important to pass an industrial liquefied nitrogen gas into the atmosphere whereby a small amount of impurities in the industrial liquefied nitrogen gas can be used for the reduction.

The industrial liquefied nitrogen gas is obtained by compressing and cooling air to form a liquid air and distilling nitrogen and special impurities from the liquid air. The special impurities include methane ($CH_4$) and carbon monoxide (CO) which impart reducing property at high temperature. The industrial liquefied nitrogen gas comprises a small amount (ppm) of such special impurities for reduction as shown in the following table. The special impurities for reduction impart the important function for the process of the present invention. It has been confirmed that free oxygen is formed in the reducing reaction and is finally discharged as oxygen. It is preferable to use the industrial liquefied nitrogen gas containing $H_2$, $CH_4$ and CO at each concentration of 2 to 100 ppm preferably 5 to 50 ppm respectively.

TABLE

|  | Pure nitrogen gas | Industrial liquefied nitrogen gas |
|---|---|---|
| Purity | higher than 99.9995% | higher than 99.999% |
| $O_2$ | less than 0.5 ppm | less than 10 ppm |
| $CO_2$ | less than 1 ppm | more than 2 ppm |
| $H_2$ | " | " |
| $CH_4$ | " | " |
| CO | " | " |
| Nitrogen oxides | less than 0.1 ppm | " |
| Moisture | D.P. lower than −70° C. | D.P. lower than −70° C. |

In accordance with the process of the present invention, a reaction temperature in the process for reducing an iron oxide, can be set at relatively lower temperature of about 600° C. whereby a sintering is not caused. Moreover, it produce a magnetite powder having higher coercive force and higher intensity of magnetization in comparison with those of the conventional process using hydrogen gas.

Therefore, magnetic recording media obtained by using the magnetite powder of the present invention or the γ-iron oxide powder obtained by oxidizing the magnetite had excellent electromagnetic convertible characteristics.

The industrial liquefied nitrogen gas is used instead of hydrogen gas, and accordingly, the cost for the production is remarkably lowered and the industrial advantages are remarkable.

The present invention will be further illustrated by certain examples and references which are provided for purposes of illustration only and are not intended to be limiting the present invention.

EXAMPLE 1

In a quartz boat, 10 g. of acicular hydrated iron oxide containing 1.2 wt.% of $SiO_2$ component which had a specific surface area of 73.9 m$^2$/g. (measured by BET method) and an average length of 0.35μ was charged and the port was set in a reducing furnace. An industrial liquefied nitrogen gas comprising impurities for reduction ($CH_4$, CO etc.) was fed at a rate of 0.5 liter per minutes into a reducing furnace which was heated at about 600° C. for 1 hour and then the furnace was cooled to obtain a magnetite powder. The magnetic characteristics of the resulting magnetite are shown as Sample A-1 in Table 1.

REFERENCE 1

In accordance with the process of Example 1 except using hydrogen gas instead of nitrogen gas and reducing at 400° C., the test was carried out. The magnetic characteristics of the resulting magnetite are shown as Sample C-1 in Table 1.

As it is clearly found, from the data of Samples A-1 and C-1, Sample A-1 (Example 1) had superior coercive force and intensity of magnetization to those of Sample C-1 (Reference 1).

EXAMPLE 2

In accordance with the process of Example 1 except using acicular hydrated iron oxide containing 0.73 wt.% of $SiO_2$ component and containing 1.3 wt.% of Zn component (based on Fe) which had a specific surface area of 56.0 m$^2$/g. (measured by BET method) and an average length of 0.4μ, instead of the acicular hydrated iron oxide the test was carried out. The magnetic characteristics of the resulting magnetite are shown as Sample A-2 in Table 1.

REFERENCE 2

In accordance with the process of Example 2 except using hydrogen gas instead of nitrogen gas and reducing at 400° C., the test was carried out. The magnetic characteristics of the resulting magnetite are shown as Sample C-2 in Table 1.

As it is clearly found, from the data of Samples A-2 and C-2, Sample A-2 (Example 2) had superior coercive force and intensity of magnetization to those of Sample C-2 (Reference 2).

In Examples, the reaction temperature was 600° C. whereas in References, the reaction temperature was 400° C. because when nitrogen gas was used, it was not reduced to form the magnetite at 400° C. whereas when hydrogen gas was used, metallic iron was formed at 600° C. and the product could not be compared with the magnetite.

TABLE 1

| Sample | Hc (Oe) | Sigma S (emu/g) | Sigma R (emu/g) | Square ratio |
| --- | --- | --- | --- | --- |
| A-1 | 423 | 82.4 | 37.5 | 0.455 |
| C-1 | 391 | 80.5 | 36.3 | 0.451 |
| A-2 | 442 | 83.6 | 40.5 | 0.484 |
| C-2 | 426 | 81.2 | 39.0 | 0.480 |

I claim:

1. In a process for producing an iron oxide comprising magnetite as the main component by heating goethite, lepidocrosite, α-iron oxide or γ-iron oxide in a reducing atmosphere, the improvement comprising using as the reducing atmosphere an industrial liquified nitrogen gas consisting of nitrogen containing 2–100 ppm of CO, 2–100 ppm of $CH_4$ and 2–100 ppm of $H_2$ and conducting the heating at a temperature of about 600° C.

2. The process according to claim 1, wherein said nitrogen gas contains 5–50 ppm of CO, 5–50 ppm of $CH_4$ and 5–50 ppm of $H_2$.

* * * * *